US 6,749,892 B2

United States Patent
Chang

(12) United States Patent
(10) Patent No.: US 6,749,892 B2
(45) Date of Patent: Jun. 15, 2004

(54) METHOD FOR FABRICATING MEMBRANE-ELECTRODE ASSEMBLY AND FUEL CELL ADOPTING THE MEMBRANE-ELECTRODE ASSEMBLY

(75) Inventor: Hyuk Chang, Seongnam (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 432 days.

(21) Appl. No.: 09/812,908

(22) Filed: Mar. 21, 2001

(65) Prior Publication Data

US 2001/0041277 A1 Nov. 15, 2001

(30) Foreign Application Priority Data

Mar. 22, 2000 (KR) .......................... 2000-14551
Nov. 30, 2000 (KR) .......................... 2000-72128

(51) Int. Cl.$^7$ .......................... B05D 5/12; H01M 8/10; H01M 4/86; H01M 4/90; C23C 14/00
(52) U.S. Cl. .......................... 427/115; 429/30; 429/40; 429/42; 429/43; 429/44; 204/192.14
(58) Field of Search .......................... 427/115; 429/30, 429/40, 42, 43, 44; 29/623.5; 204/192.14, 192.38

(56) References Cited

U.S. PATENT DOCUMENTS

| | | | |
|---|---|---|---|
| 5,084,144 A | | 1/1992 | Reddy et al. |
| 5,102,750 A | * | 4/1992 | Taylor .......................... 429/30 |
| 5,234,777 A | | 8/1993 | Wilson |
| 5,338,430 A | * | 8/1994 | Parsonage et al. .......... 204/412 |
| 5,750,013 A | * | 5/1998 | Lin .......................... 204/192.14 |
| 5,869,202 A | * | 2/1999 | Marchetti .......................... 429/30 |
| 6,106,965 A | | 8/2000 | Hirano et al. |
| 6,136,412 A | * | 10/2000 | Spiewak et al. .......... 428/143 |

FOREIGN PATENT DOCUMENTS

| | | |
|---|---|---|
| EP | 0 860 888 | 8/1998 |
| JP | 5-258756 | 10/1993 |
| JP | 8-148176 | 6/1996 |
| JP | 9-265993 | 10/1997 |
| JP | 10-212570 | 8/1998 |
| JP | 11-279784 | 10/1999 |
| WO | WO 99/13128 | 3/1999 |

OTHER PUBLICATIONS

Hirano, et al., "High performance proton exchange membrane fuel cells with sputter–deposited Pt layer electrodes", Electrochemica Acta, 41(10):1587–1593, (1997).
Cha et al, "Performance of proton exchange . . . ", J. Electrochemical Soc., 146(11):4055–4060 (1999).
Hirano et al, "High performance proton . . . ", Electrochimica Acta, Elsevier, 42(10):1587–1593, (1997).

* cited by examiner

*Primary Examiner*—Stephen Kalafut
*Assistant Examiner*—Julian Mercado
(74) *Attorney, Agent, or Firm*—Lee & Sterba, P.C.

(57) ABSTRACT

A method for fabricating a membrane-electrode assembly, and fuel cells adopting a membrane-electrode assembly formed by the method, wherein the method includes: coating nano-sized catalytic metal particles on a proton exchange polymer membrane by sputtering a catalytic metal source; coating nano-sized carbon particles on the proton exchange polymer membrane by arc discharging or by sputtering a carbon source to form a nanophase catalyst layer; and bonding electrodes to the proton exchange polymer membrane having the nanophase catalyst layer. The nano-sized catalytic metal and nano-sized carbon particles can be coated on a proton exchanger polymer membrane to form a catalyst layer by simultaneously sputtering a catalyst metal source and a carbon source.

14 Claims, 4 Drawing Sheets

METHOD FOR FABRICATING MEMBRANE-ELECTRODE ASSEMBLY AND FUEL CELL ADOPTING THE MEMBRANE-ELECTRODE ASSEMBLY

BACKGROUND OF THE INVENTION

1. Field of the Invention

The present invention relates to a method for fabricating a membrane-electrode assembly and fuel cells adopting a membrane-electrode assembly formed by the method and, more particularly, to a method for fabricating a membrane-electrode assembly employing a nanophase catalyzed membrane, in which the size of carbon particles serving as a support catalyst is controlled, and fuel cells with an improved power density which use a membrane-electrode assembly containing the catalyzed membrane formed by the method.

2. Description of the Related Art

Proton exchange membrane fuel cells (PEMFCs) emerging as a future generation clean energy source alternative to fossil energy have a high power density and a high energy conversion efficiency. In addition, PEMFCs operate at room temperature and are easy to seal and miniaturize, so that they can be extensively applied to and used in the field of portable electronic devices.

The PEMFC is a power generator for producing direct current through electrochemical reaction of hydrogen and oxygen. The basic structure of such a cell is shown in FIG. 1. Referring to FIG. 1, the PEMFC has a proton exchange membrane 11 interposed between the anode and the cathode to which reaction gases are supplied. The proton exchange membrane 11 is formed of a solid polymer electrolyte (SPE) with a thickness of 50–200 $\mu$m. The anode consists of an anode backing layer 14 and a catalyst layer 12 on the anode backing layer 14. The cathode consists of a cathode backing layer 15 and a catalyst layer 13 on the cathode backing layer 15. The anode and cathode backing layers 14 and 15 are formed of carbon cloth or carbon paper. The surfaces of the anode and cathode backing layers 14 and 15 are treated for easy reaction gases or liquid assess, and for water permeability to the proton exchange membrane 11. In FIG. 1, reference numeral 16 denotes a bipolar plate serving as a current collector and having flow pattern for gas supply.

As reaction gases are supplied to a PEMFC having such a structure described above, hydrogen molecules are decomposed into protons and electrons by oxidation reaction in the anode. The produced protons reach the cathode through the proton exchange membrane 11. Meanwhile, in the cathode oxygen molecules take electrons from the anode and are reduced to oxygen ions by reduction. The produced oxygen ions react with hydrogen ions from the anode and produce water.

On the other hand, direct methanol fuel cells (DMFCs) have the same structure as the PEMFC described previously above but use liquid methanol instead of hydrogen as a fuel source. As methanol is supplied to the anode, an oxidation reaction occurs in the presence of a catalyst, and protons, electrons and carbon dioxide are generated. Although the energy efficiency of the DMFC is lower than the PEMFC, use of a liquid fuel in the DMFC makes its application to and use in portable electronic devices easier.

In the previously described fuel cells, as shown in FIG. 2A, a catalyst layer 21 includes carbon particles 22 loaded with catalytic metal particles 23, and a binder (not shown). The carbon particles 22 function as a reaction base for the incoming reaction gases and increase the chance of reaction of the gases. The catalytic metal particles 23 initiate an oxidation/reduction of fuel sources, such as hydrogen, methanol or oxygen. The binder contributes to strengthening the binding force between the catalyst layer and the proton exchange membrane to prevent delamination of the catalyst layer from the electrodes even if the cell is used for a longer period of time.

Carbon particles are loaded with catalytic metal particles typically by a reduction method. According to this reduction method, a compound having a catalytic metal as its cation is reduced such that only the catalytic metal appears on the surface of a carrier such as carbon particles. As a result, the surface of carbon particles is coated with catalytic metals. A method for forming a catalytic layer using such catalytic metal loaded carbon particles will be described below.

First, platinum-on-carbon (Pt/C) is prepared by coating 0.1-$\mu$m carbon particles with 2~5-nm ultrafine catalytic metal particles, for example, platinum particles, and polytetrafluoroethylene is added as a binder. The resulting composition is deposited in a film form, impregnated with an ionomer solution, and dried, thereby resulting in a complete catalytic layer.

However, this method is disadvantageous in that the entire volume of carbon particles cannot be fully utilized because carbon particles are tens to hundreds times larger than catalytic metal particles. Furthermore, another drawback lies in that a contact area between the proton exchange membrane and the catalytic layers, where catalytic reactions take place, is very small. Because the reactions, such as diffusion of reaction gases, or collection of current, take place in the catalyst-and-carbon particles contact surface, such a catalyst structure in which a relatively large carbon particle is loaded with a large number of catalytic particles is considered as being inefficient.

To solve this problem, a method for forming a catalyst layer directly on a proton conductive membrane by a decal process (U.S. Pat. No. 5,234,777), and a method for uniformly dispersing a catalytic metal over the surface of electrodes (Electrochemica Acta., Vol. 42, No. 10, pp. 1587–1593) have been suggested.

To the former, a catalytic layer composition is coated on a support, and then peeled off to obtain a thin catalyst film. The catalyst film is pressed into the surface of a proton exchange membrane to form a complete catalytic layer. However, this method has the following disadvantages. Although the formation of the catalytic layer is effective in increasing the contact area between the catalytic layer and the proton exchange membrane, it is difficult to fully disperse catalyst particles over the surface of the proton exchange membrane because carbon particles serving as a support for the catalyst have a size of a few micrometers. This is evidenced from FIGS. 2A and 2B. To produce an electrode with a higher power density than a predetermined level, the amount of reaction gases for reactions as well as the amount of catalyst must be increased. The increased amount of reaction gases lowers utilization efficiency of the catalyst, and undesirably increases the weight, volume and price of a completed cell. The catalytic layer is bonded to the proton exchange membrane by high-temperature and high-pressure pressing, so that the proton exchange membrane degrades during this hot pressing process.

On the other hand, according to the conventional method for dispersing catalyst metals over the surface of electrodes by sputtering, catalyst utilization efficiency is low because the catalytic metal particles penetrate into porous electrodes. Because the catalytic metal particles are coated on the surface of the carbon particles having a size of a few micrometers, bonding between the catalyst layer and the proton exchange membrane, which allows electrochemical reactions to occur at the contact area, can not be smoothly achieved, so that utilization efficiency of the catalyst becomes low.

SUMMARY OF THE INVENTION

It is a feature of a preferred embodiment of the present invention to provide a method for fabricating a membrane-electrode assembly with an improved structure, in which the size of carbon particles serving as a support catalyst is controlled, so that fuel can be efficiently supplied with high utilization efficiency of catalyst.

It is another feature of a preferred embodiment of the present invention to provide fuel cells with improved power densities, having a membrane-electrode assembly fabricated by the method.

According to another feature of a preferred embodiment of the present invention, there is provided a method for fabricating a membrane-electrode assembly, the method comprising: coating nano-sized catalytic metal particles on a proton exchange polymer membrane by sputtering a catalytic metal source, coating nano-sized carbon particles on the proton exchange polymer membrane by arc discharging or by sputtering a carbon source to form a nanophase catalyst layer, and bonding electrodes to the proton exchange polymer membrane having the nanophase catalyst layer.

According to another feature of a preferred embodiment of the present invention, there is provided a method for fabricating a membrane-electrode assembly, the method comprising: coating nano-sized catalytic metal and carbon particles on a proton exchange polymer membrane by simultaneously sputtering a catalytic metal source and a carbon source to form a nanophase catalyst layer, and bonding electrodes to the proton exchange polymer membrane having the nanophase catalyst layer.

The catalytic metal source includes pure platinum (Pt) and an alloy or a mixture of Pt and at least one metal selected from the group consisting of gold (Au), palladium (Pd), rhodium (Rh), iridium (Ir), ruthenium (Ru), tin (Sn), and molybdenum (Mo). The carbon source includes graphite and carbon rod. It is preferable that the catalyst layer has a thickness of 10–100 nm, and the coated catalytic metal and carbon particles have a particle size of 2–10 nm.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Korean Patent Application Nos. 00-14551 and 00-72128 filed Mar. 22, 2000 and Nov. 30, 2000, respectively, upon which priority is claimed, are incorporated herein by reference in their entirety.

The term "membrane-electrode assembly" used through this specification is defined as an assembled structure including a proton exchange membrane interposed between the anode and cathode.

In a method for fabricating a membrane-electrode assembly according to the present invention, the proton exchange membrane employing a catalyst layer is prepared by coating the proton exchange membrane with a catalytic metal, and then with carbon. Alternatively, a catalytic metal and carbon may be simultaneously coated on a proton exchange membrane to form the proton exchange membrane. The particles of the coated catalytic metal and carbon are nano-sized and vary according to the conditions of sputtering and arc discharge applied to the coatings.

Figure 1:
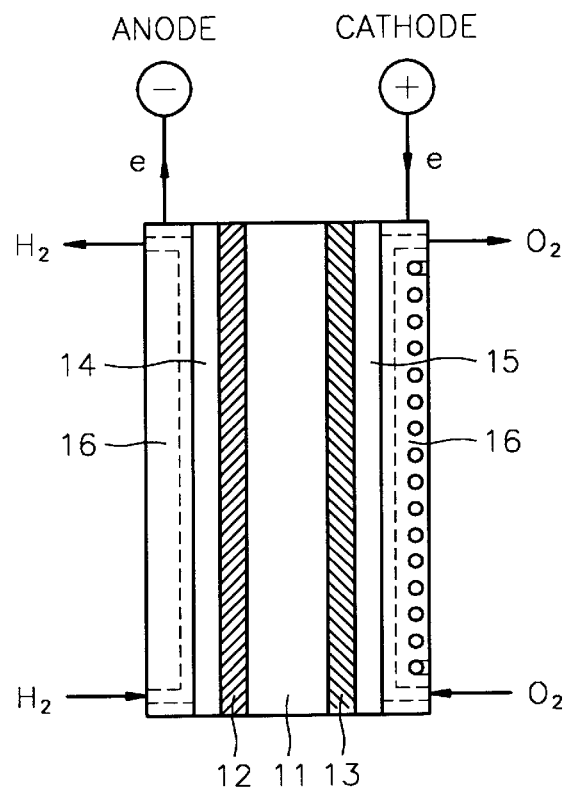
FIG. 1 is a schematic diagram of a conventional proton exchange membrane fuel cell (PEMFC)
Figure 2A:
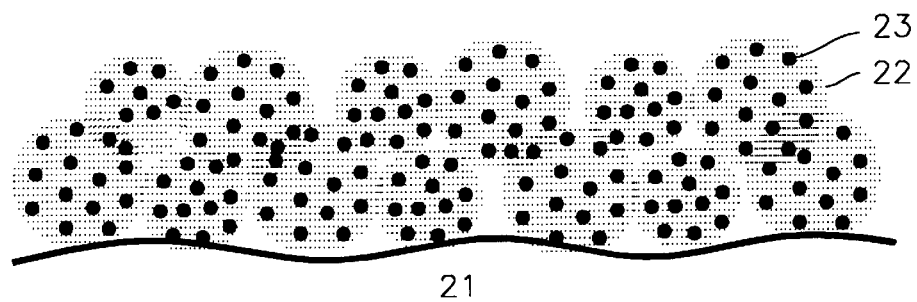
FIG. 2A is a schematic diagram of a conventional catalyst layer.
Figure 2B:
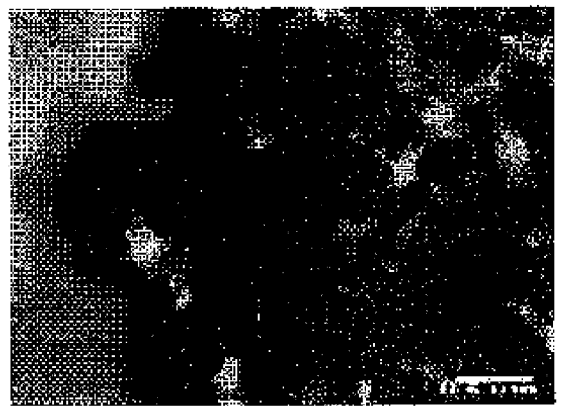
FIG. 2B is a transmission electron microscope (TEM) photo (×500,000) of a conventional catalyst layer.
Figure 2C:
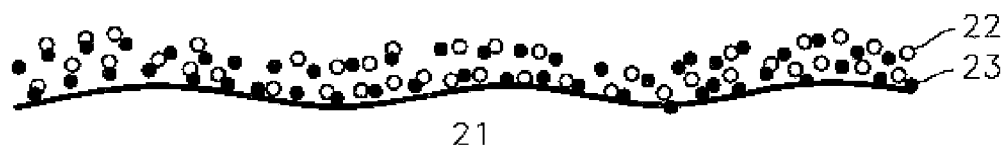
FIG. 2C is a schematic diagram of a catalyst layer according to a preferred embodiment of the present invention.
Figure 2D:
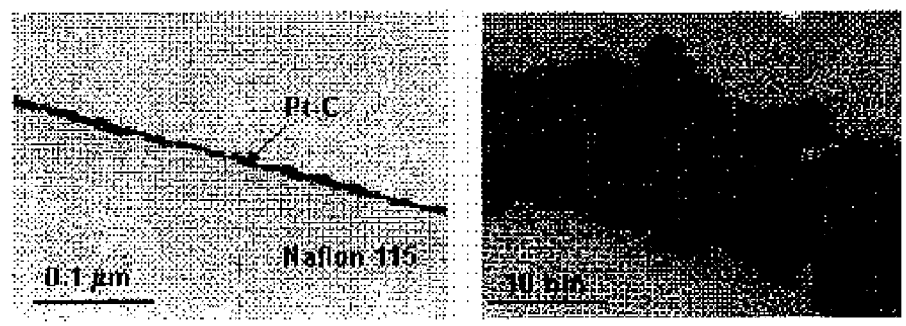
FIGS. 2D, 2E and 2F are TEM photos (×500,000) of a catalyst layer according to a preferred embodiment of the present invention.
Figure 2E:
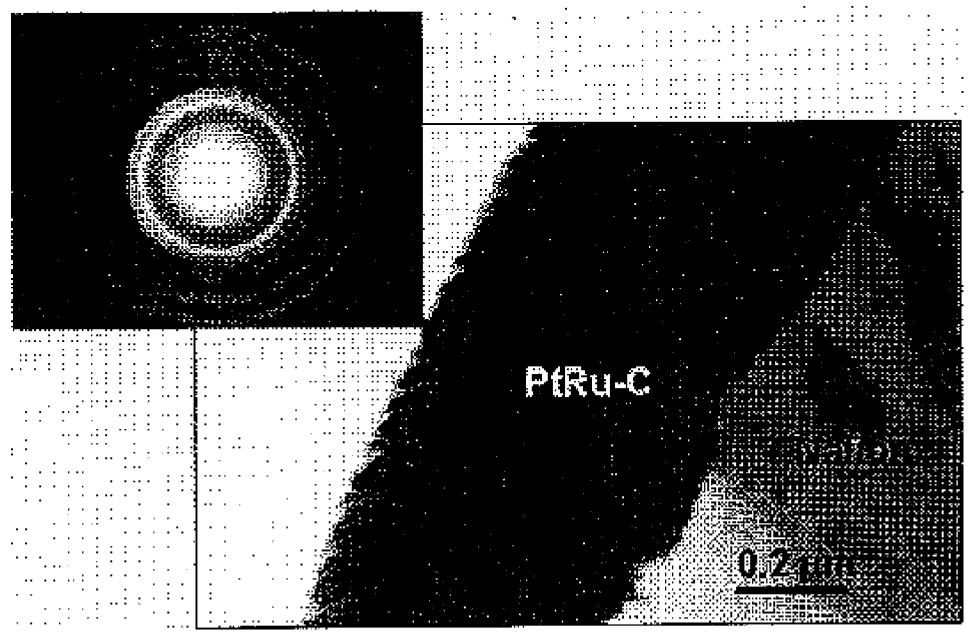
Figure 2F:
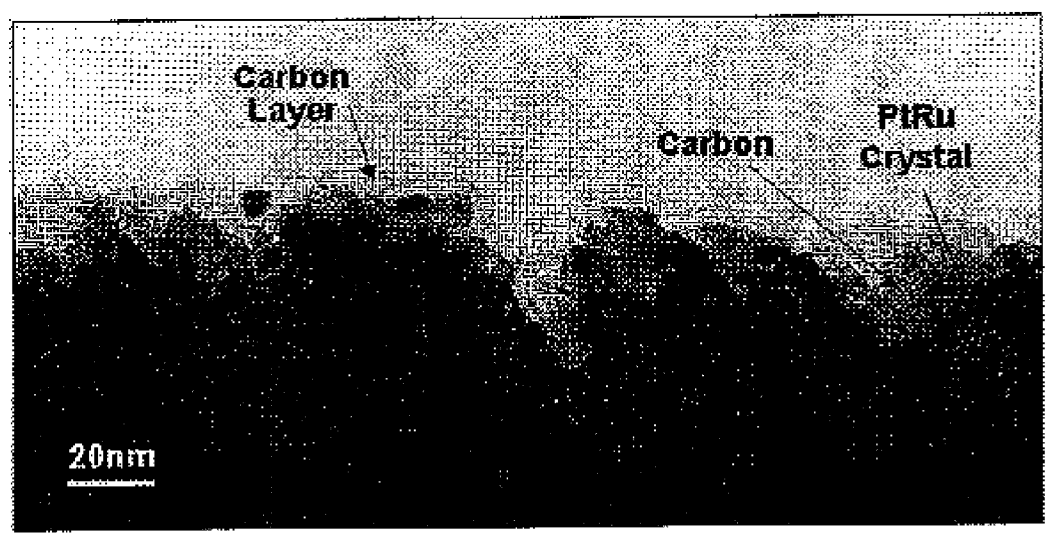

The catalyst layer according to the present invention has a structure as illustrated in FIGS. 2C through 2F. FIG. 2C is a schematic diagram of a catalyst layer according to a preferred embodiment of the present invention. FIGS. 2D through 2F are transmission electron microscope (TEM) photos (×500,000) of the catalyst layers according to a preferred embodiment of the present invention. Referring to FIGS. 2C through 2F, nano-sized carbon and metal catalyst particles are uniformly dispersed as a catalyst layer over a proton exchange membrane. The catalyst layer is dense and can formed as a thin film. Use of the catalyst layer including uniformly dispersed catalyst and carbon particles improves utilization efficiency of the catalyst, compared to the conventional catalyst layer illustrated in FIGS. 2A and 2B.

A method for forming a catalyst layer for a membrane-electrode assembly according to the present invention will now be described in greater detail. First, a proton exchange polymer membrane as a base is pre-treated to allow easy coating of metal catalyst and carbon in subsequent processes. This pre-treatment also ensures reaction efficiency after the coating of the catalyst and carbon particles is completed. The pre-treatment involves removing water from the surface of a proton exchange polymer membrane, which has undergone a cleaning process, in a reaction chamber in a vacuum state, wherein the reaction chamber will be used for the coating of catalytic metal and carbon. For the pre-treatment by vacuum drying, or for the coating of catalytic metal and carbon particles, which will be described later, it is preferable to affix the corners of the proton exchange polymer layer to a support frame having a predetermined size for leveling.

Once the pre-treatment is completed, nano-sized metal catalyst particles are coated over one side of the proton exchange polymer membrane by sputtering. Suitable catalytic metal sources include pure platinum (Pt), an alloy and a mixture of Pt and at least one metal selected from the group consisting of gold (Au), palladium (Pd), rhodium (Rh), iridium (Ir), ruthenium (Ru), tin (Sn), and molybdenum (Mo). For catalyst utilization efficiency, it is preferable that Pt is used as a catalytic metal source in proton exchange membrane fuel cells (PEMFCs), that a Pt/Ru alloy is used in direct methanol fuel cells (DMFCs), and that the catalytic metal has a particle size between 2–10 nm.

Any known sputtering method may be applied to coat the proton exchange polymer membrane with the catalytic metal. A magnetron direct current (DC) sputtering method is preferred. According to this sputtering method, as metal atoms fall down from a bulk target by attack of accelerated inert gas, plasma is uniformly formed by a magnetron, and the metal in a plasma state is coated on the proton exchange polymer membrane. This coating allows uniform dispersion of nano-sized catalytic metal. Here, the sputtering conditions may be varied according to the particle size of catalytic metal and the degree of dispersion of catalytic metal.

The reaction chamber is evacuated to a vacuum level of $10^{-6}$ Pa or less. As a reaction gas for the sputtering, an inert gas is used. Preferably, argon (Ar) or a mixture of Ar and helium (He) is used to keep a vacuum level at $10^{-6}$ Pa or less. Here, Ar is directly involved in sputtering, and He acts to adjust the porosity of the resulting metal coated layer by hitting the metal particles in a plasma state to take or absorb a portion of their kinetic energy. If the metal coated layer is highly dense due to its low porosity, fuel transfer is not easy.

During the sputtering, a gas pressure is preferably adjusted in the range between 10–1,000 Pa, and a sputter gun power is preferably adjusted in the range between 100–400W. This gas pressure level is higher than for a general thin film formation process performed at a gas pressure between 0.01–0.1 Pa. If the gas pressure for sputtering is less than 10 Pa, the resulting catalyst layer is so dense that gaseous or liquid fuel permeability becomes low., If the gas pressure for sputtering exceeds 1,000 Pa, uniform plasma formation is not ensured.

If the sputter gun power is less than 100W, the particle size of the catalytic metal in the resulting catalyst layer is smaller than desired. If the sputter gun power is greater than 400W, uniform plasma formation is not ensured.

Once the catalyst layer is deposited on one side of the proton exchange polymer membrane, the sputtering described above is repeated for the other side to coat nano-sized catalytic metal thereon. The amount of catalytic metal loading may be varied according to sputtering time and sputtering power. The particle size of catalytic metals is determined depending on the reaction gas pressure and sputtering power.

To prevent heat transfer from the target to the proton exchange polymer membrane, it is preferable that the sputtering is carried out a few times with a predetermined time gap, rather than as a one-step continuous process.

After the catalytic metal sputtering is completed, nano-sized carbon particles are coated on one side of the catalytic metal coated proton exchange polymer membrane by sputtering, or by a cathode arc discharge method. As a carbon source, at least one of graphite and carbon rod is used.

If a sputtering method is selected to coat carbon particles, the same sputtering conditions as in the catalytic metal sputtering are applied for the carbon sputtering. If an arc discharge method is selected, the power level and discharging time may be adjusted to form a carbon coated layer having a desired thickness with desired nano-sized particles.

When a carbon source is deposited by arc discharging, the gas pressure is adjusted in the range of 10–1,000 Pa, and a discharge current is adjusted to 100 A or less. If the gas pressure is lower than 10 Pa, the resulting catalyst layer is so dense that gaseous or liquid fuel permeability becomes low. If the gas pressure for sputtering exceeds 1,000 Pa, uniform plasma formation is not ensured. If the discharge current exceeds 100 A, uniformity and size of the carbon particles cannot be accurately controlled.

The same process is performed on the other side of the proton exchange polymer membrane to coat nano-sized carbon particles thereon as a nanophase catalyst layer. It is preferable that the size of carbon particles is in the range of 2–5 nm. More preferably, the shape and size of carbon particles are similar to those of the coated catalytic metal in terms of catalyst utilization efficiency.

It is preferable that the resulting catalyst layer has a thickness of 10–100 nm. If the thickness of the catalyst layer is greater than 100 nm, it is difficult to form the effective interface with the proton membrane.

The amount of catalyst loading per electrode area is preferable in the range of 0.01–0.2 mg/cm$^2$ for PEMFCs, and in the range of 0.1–2 mg/cm$^2$ for DMFCs. If the amount of catalyst loading is below these ranges, the catalytic activity is poor. If the amount of catalyst loading exceeds these ranges, utilization efficiency of the catalyst becomes lower.

The amount of the catalytic metal coated by the method described previously is preferably in the range of 20–85% by weight, more preferably, 25–80% by weight, based on the total amount of catalytic metal and carbon particles. If the amount of the catalytic metal is below this range, utilization efficiency of the catalyst decreases. If the amount of the catalytic metal exceeds this range, fuel permeability becomes poor.

When a binary or ternary catalytic metal is applied, an alloy or mosaic target having an intended catalyst composition may used as a catalytic metal source. Alternatively, a plurality of sputter guns, each of which hits 2–3 targets, may be used.

When the nanophase catalyst layer is formed with nano-sized catalytic metal and carbon particles, as previously described, the catalytic metals and carbon particles penetrate deeply into the proton exchange polymer membrane through its cavities, with the result that there is a greater efficiency of oxidation and reduction reactions occurring near the surfaces of the proton exchange polymer membrane as compared with the conventional catalyst layer illustrated in FIG. 2A. In addition, a catalytic layer can be formed on both sides of the proton exchange membrane in a thin film form. In particular, for a DMFC with a proton exchange polymer membrane, the catalyst layer adjacent to the anode is formed as a thin film, cross-over of methanol can be effectively suppressed.

Although in the previous description, the catalyst layer is formed by a two-stage coating process, i.e., coating of catalytic metal and coating of carbon particles, catalytic metal and carbon particles may be simultaneously coated on the proton exchange membrane by sputtering. It is preferable that the catalytic metal is coated by magnetron sputtering, and the carbon particles are coated by radio frequency (RF) sputtering.

A method for fabricating a membrane-electrode assembly according to the present invention will be described below. Electrodes are placed on each side of the proton exchange membrane coated with nano-sized catalytic metal and carbon particles, and hot pressed to form a complete membrane-electrode assembly according to the present invention. The pressing temperature is determined such that the proton exchange membrane is soften in that temperature range, for example, to 125° C. for NAFION® (a registered trademark of E.I. duPont de Nemours and Company). The pressure level is about 200 kgf/cm². As the electrodes, a conductive carbon cloth or carbon paper may be used.

Following this, a bipolar plate is attached to both sides of the membrane-electrode assembly, so that a completed fuel cell is obtained. The bipolar plate has cavities through which fuel is supplied inside the cell, and also serves as a current collector.

Preferred embodiments of the present invention will now be described in detail by means of the following examples. The following examples are for illustrative purposes and are not intended to limit the scope of the invention.

EXAMPLE 1

NAFION® 115 (manufactured by E.I. duPont de Nemours and Company) as a proton exchange polymer membrane was pre-treated as follows. A stainless steel support frame was manufactured for easy handling in a vacuum chamber, and a predetermined active region (25 cm²) of the proton exchange polymer membrane was exposed through the support frame. The corners of the proton exchange polymer membrane were affixed to the support frame, and left in a vacuum for 10 minutes to remove water. The degree of vacuum was controlled at $10^{-6}$ Pa.

One side of the pre-treated proton exchange polymer membrane was coated with Pt by magnetron sputtering. The magnetron sputtering was carried out for 400 seconds using a gas mixture of Ar and He in a 1:1 ratio as a reaction gas at a pressure of 100 Pa with a sputter gun power of 300 W. To avoid heat transfer from the target to the proton exchange polymer membrane arising from a long sputtering period, two separate sputtering steps were carried out with each sputtering step being carried out for a duration of 200 seconds.

Once the sputtering was completed, the other side of the proton exchange polymer membrane was coated with Pt by the same sputtering process. The particle size of the coated Pt catalyst was on the order of about 3 nm.

The Pt-coated proton exchange polymer membrane which was affixed to the stainless steel support frame was transferred to an arc chamber. A graphite bar was used as a carbon source, and a predetermined voltage that causes a discharge current of 40 A was applied to the electrode to coat one side of the proton exchange polymer membrane with carbon. The other side of the catalyzed proton exchange polymer membrane was coated with carbon by the same discharging, so that both sides of the proton exchange polymer membranes were coated with catalyst and carbon. The pressure of the arc chamber was controlled at about 10 Pa. Three arc dischargings were carried out on each side of the proton exchange polymer membrane, each arc discharging being carried out for a duration of 10 seconds. The amount of coated Pt was about 0.06 mg/cm² and the amount of carbon was about 0.6 mg/cm². The particle size of Pt and carbon particles was about 3 nm. The amount of Pt was equivalent to 25% by weight based on the total weight of the Pt and carbon particles.

A carbon paper (Toray Carbon Paper, E-Tek Co.), which was water-proof treated with a 20:80 tetrafluoroethylene and hexafluoropropylene copolymer, was used as a backing layer. The carbon paper was bonded to the proton exchange polymer to obtain a membrane-electrode assembly (MEA). This bonding process was carried out using a hot press at 125° C. with a load of about 200 kgf/cm² for 3 minutes. A PEMFC was thereby manufactured with the MEA.

EXAMPLE 2

One side of a proton exchange polymer membrane (NAFION® 115) adjacent to the anode was coated simultaneously with a Pt/Ru alloy by DC sputtering and with carbon by RF sputtering, and then the other side of the proton exchange polymer membrane was coated with Pt and carbon by the same methods, to form catalyst layers on the proton exchange polymer membrane. The gas pressure as a total pressure of Ar and He was 100 Pa. The DC sputtering was performed under the same conditions as in Example 1, and the RF sputtering was performed with a power of 300 W. With the catalyzed proton exchange polymer membrane, a MEA and a DMFC were manufactured in a manner similar to that described in Example 1. The amount of coated Pt/Ru alloy and Pt was about 1.5 mg/cm², and the amount of coated carbon was about 0.375 mg/cm². The particle size of the catalytic metals and the carbon particles was in the range of between about 5–10 nm. The amount of the catalytic metals was equivalent to about 80% by weight based on the total weight of the catalytic metal particles and carbon particles.

COMPARATIVE EXAMPLE 1

A catalyst layer was formed by a spray method with Pt-doped carbon support (20% Pt/C, E-Tek Co.) formed by electrochemical reduction. A MEA and a PEMFC were manufactured in the same manner as in Example 1. The amount of coated Pt was 0.2 mg/cm², which was 100 times more than the PEMFC of Example 1. The amount of carbon particles was 0.8 mg/cm². The amount of the Pt was equivalent to 20% by weight based on the total weight of the Pt particles and carbon particles. The particle size of the coated catalytic metal was about 5 nm, and the particle size of the carbon particles was about 100 nm.

COMPARATIVE EXAMPLE 2

A MEA and PEMFC were manufactured in the same manner as in Comparative Example 1, except that the amount of Pt coated per electrode area was 0.02 mg/cm².

COMPARATIVE EXAMPLE 3

A catalyst layer was formed by a spray method with a Pt/Ru-doped carbon support (60% Pt-Ru/C, E-Tek Co.) formed by electrochemical reduction, and a Pt-doped carbon support (20% Pt/C, E-Tek Co.). A MEA and a DMFC were manufactured in the same manner as in Example 2. The amount of Pt/Ru (Pt:Ru=1:1) coated and the amount of Cu coated were 8 mg/cm², which were 5.3 times more than the DMFC of Example 2. The amount of carbon particles was 3.2 mg/cm². The amount of the catalytic metals was equivalent to 60% by weight based on the total weight of the catalytic metal particles and carbon particles. The particle size of the coated catalytic metals was about 5 nm, and the particle size of the carbon particles was about 100 nm.

COMPARATIVE EXAMPLE 4

A MEA and DMFC were manufactured in the same manner as described in Comparative Example 3, except that the amount of Pt/Ru and the amount of Pt coated per electrode area were 1.5 mg/cm².

Figure 3:
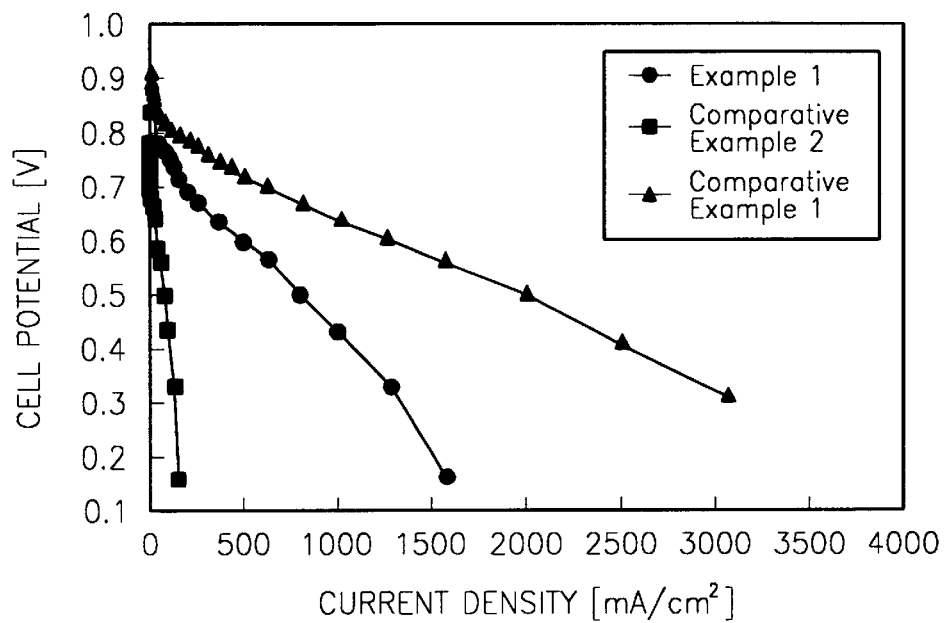
FIG. 3 is a graph illustrating cell potential variations with respect to current density in the PEMFCs of Example 1 and Comparative Examples 1–2.

The PEMFCs manufactured in Example 1 and Comparative Examples 1 and 2 were operated using humidified oxygen and hydrogen gases (a 1:1 gas pressure ratio), and the polarization characteristics and power densities of the PEMFCs were evaluated. As shown in the TEM photo of FIG. 2D, the structure and integrity of the catalyst layer of Example 1 are improved. The polarization characteristic and the power density are also improved for the PEMFC of Example 1, as shown in FIG. 3, when compared with the PEMFCs of Comparative Examples 1 and 2.

Figure 4:
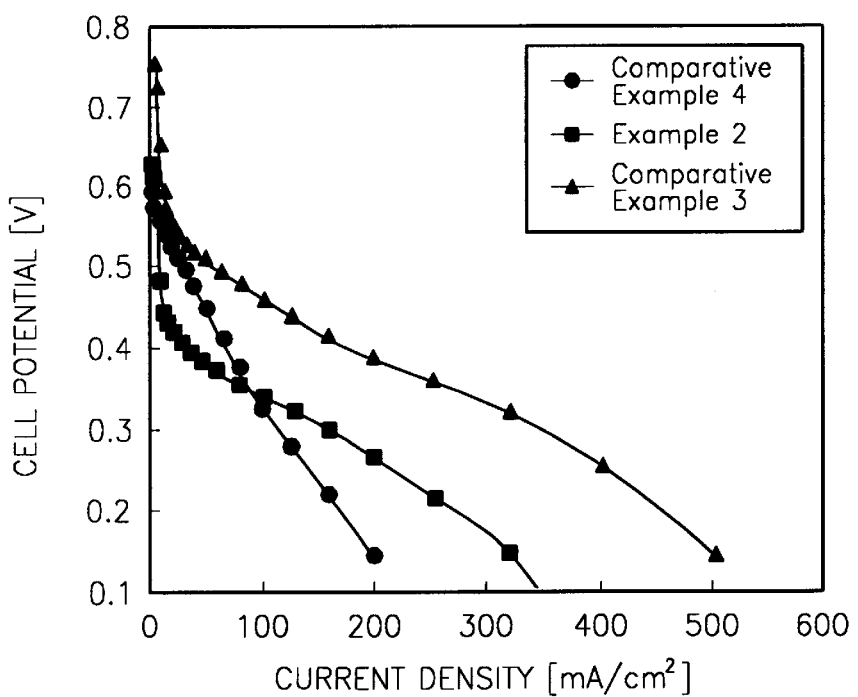
FIG. 4 is a graph illustrating cell potential variations with respect to current density in direct methanol fuel cells (DMFCs) of Example 2 and Comparative Examples 3–4.

The DMFCs manufactured in Example 2, and Comparative Examples 3 and 4 were operated using a 2-M methanol solution and air, and the polarization characteristics and power densities of the DMFCs were evaluated. As shown in the TEM photos of FIGS. 2E and 2F, the structure and integrity of the catalyst layer of Example 2 are improved. The polarization characteristic and the power density are excellent for the DMFC of Example 2, as shown in FIG. 4, when compared with the DMFCs of Comparative Examples 3 and 4. In particular, unlike the DMFCs of Comparative Examples 3 and 4, the catalyst layer of the DMFC of Example 2 which is adjacent to the anode is formed as a thin film, so that cross-over of methanol can be suppressed.

As previously described, use of nano-sized catalytic metal and carbon particles enlarges the contact area between the catalyst layer and proton exchange polymer membrane. In addition, ultrafine catalytic metal particles easily penetrate into the proton exchange polymer membrane through small cavities formed on the surface. This structure of the catalyst layer allows oxidation and reduction reactions to occur at the surface of the proton exchange polymer membrane with a high degree of efficiency. Direct coating such catalytic metal and carbon particles on the proton exchange polymer membrane reduces the amount of catalyst required and improves catalyst utilization efficiency with improved fuel gas permeability. Furthermore, the catalyst layer adjacent to the anode is formed in a thin film form so that cross-over of methanol can be effectively suppressed for a DMFC using the liquid fuel.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for fabricating a membrane-electrode assembly, the method comprising:
   coating nano-sized catalytic metal particles on a proton exchange polymer membrane by sputtering a catalytic metal source;
   coating nano-sized carbon particles on the proton exchange polymer membrane by arc discharging or by sputtering a carbon source to form a nanophase catalyst layer; and
   bonding electrodes to the proton exchange polymer membrane having the nanophase catalyst layer.

2. The method of claim 1, wherein the catalytic metal source is pure platinum (Pt), an alloy or a mixture of Pt and at least one metal selected from the group consisting of gold (Au), palladium (Pd), rhodium (Rh), iridium (Ir), ruthenium (Ru), tin (Sn), and molybdenum (Mo); and the carbon source is selected from the group consisting of graphite and carbon rod.

3. The method of claim 1, wherein the catalyst layer has a thickness of 10–100 nm, and the coated catalytic metal and carbon particles have a particle size of 2–10 nm.

4. The method of claim 1, wherein the amount of the catalytic metal loading per electrode area is in the range of 0.01–0.2 mg/cm$^2$ for a proton exchange membrane fuel cell, and is in the range of 0.1–2 mg/cm$^2$ for a direct methanol fuel cell.

5. The method of claim 1, wherein the amount of the catalytic metal coated is in the range of 20–85% by weight based on the total weight of the catalytic metal and the carbon particles.

6. The method of claim 1, wherein sputtering the catalytic metal source or the carbon source is carried out at a gas pressure of 10–1,000 Pa with a power of 100–400 W.

7. The method of claim 1, wherein the arc discharging is carried out at a gas pressure of 10–1,000 Pa and a discharge current of 100 A or less.

8. A method for fabricating a membrane-electrode assembly, the method comprising:
   coating nano-sized catalytic metal and nano-sized carbon particles on a proton exchange polymer membrane by simultaneously sputtering a catalytic metal source and a carbon source to form a nanophase catalyst layer; and
   bonding electrodes to the proton exchange polymer membrane having the catalyst layer.

9. The method of claim 8, wherein the catalytic metal source is pure platinum (Pt), an alloy or a mixture of Pt and at least one metal selected from the group consisting of gold (Au), palladium (Pd), rhodium (Rh), iridium (Ir), ruthenium (Ru), tin (Sn), and molybdenum (Mo); and the carbon source is selected from the group consisting of graphite and carbon rod.

10. The method of claim 8, wherein the catalyst layer has a thickness of 10–100 nm, and the coated catalytic metal and carbon particles have a particle size of 2–10 nm.

11. The method of claim 8, wherein the amount of the catalytic metal loading per electrode area is in the range of 0.01–0.2 mg/cm$^2$ for a proton exchange membrane fuel cell, and is in the range of 0.1–2 mg/cm$^2$ for a direct methanol fuel cell.

12. The method of claim 8, wherein the amount of the catalytic metal coated is in the range of 20–85% by weight based on the total weight of the catalytic metal and the carbon particles.

13. The method of claim 8, wherein sputtering the catalytic metal source or the carbon source is carried out at a gas pressure of 10–1,000 Pa with a power of 100–400 W.

14. The method of claim 8, wherein the arc discharging is carried out at a gas pressure of 10–1,000 Pa and a discharge current of 100 A or less.

* * * * *